United States Patent [19]
Eberle et al.

[11] 3,800,032
[45] Mar. 26, 1974

[54] ACTIVE MAGNESIUM OXIDE
[75] Inventors: Herbert Eberle, Hannover; Wolfgang Meyer, Benthe; Helmut Bartling, Ronnenbarg, all of Germany
[73] Assignee: Salzdetfurth AG
[22] Filed: Nov. 9, 1971
[21] Appl. No.: 197,155

[30] Foreign Application Priority Data
Dec. 7, 1970  Germany.............................. 2060089

[52] U.S. Cl.................................. 423/636, 423/164
[51] Int. Cl........... C01f 5/08, C01f 5/02, C01f 5/16
[58] Field of Search............................. 423/636, 164

[56] References Cited
UNITED STATES PATENTS
3,111,376  11/1963  Patton et al. ................... 423/164 X
2,035,460  3/1936  Chesny .............................. 423/164
2,219,726  10/1940  Seaton ........................... 423/636 X

*Primary Examiner*—Oscar R. Vertiz
*Assistant Examiner*—Brian E. Hearn
*Attorney, Agent, or Firm*—Laurence, Laurence & Neilan

[57] ABSTRACT

A process for the preparation of active magnesium oxide having a large specific area by dispersing magnesium hydroxide or oxide with water forming a turbid liquid having a turbidity density of about 5 to 20 percent and vigorously agitating the liquid for about 5 to 60 minutes, the temperature of the turbid liquid being kept at about 80° to 110° C throughout the process, by introducing steam, washing the filter cake, drying and calcining the separated magnesium compound to obtain large surface area magnesium oxide.

7 Claims, No Drawings

ACTIVE MAGNESIUM OXIDE

Thermal decomposition of magnesium compounds such as magnesium carbonate, oxalate or hydroxide at temperatures between 300° and 500° C produces a magnesium oxide with a particularly large specific surface area.

On account of this property and its purity, such magnesium oxide is used as a filler for elastomers and adhesives as well as a covering material for transformer plates, as a catalyst, catalyst carrier and adsorbent and in nuclear fuel elements.

The conversion of magnesium hydroxide to magnesium oxide is known to begin at a temperature of 300° C. The specific surface area of the resultant magnesium oxide increases very rapidly as the temperature rises, then gradually declines from a temperature of 400° C.

In this heat treatment it is particularly important that the steam released should be rapidly removed. For this purpose air, pre-dried air or inert gas may be passed over the magnesium hydroxide being treated or calcination can be carried out *in vacuo*.

The specific surface area of active magnesium oxide is generally determined by iodine adsorption. Magnesium oxide obtained by the above-mentioned known method should attain iodine values — milli-equivalents of adsorbed iodine per 100 g magnesium oxide — of over 100 to a maximum of 300. With very pure magnesium hydroxide the smallest quantities of aluminum oxide (ppm quantities) will increase the activity maximum and shift it towards a lower calcining temperature.

The preliminary treatment of the magnesium hydroxide used for such calcination is also known to be of fundamental importance. For example, a magnesium hydroxide precipitated from sea water must have a residual chlorine content of less than 1 percent by weight.

In the numerous experiments in converting electrolytically produced magnesium hydroxide to magnesium oxide by the above-mentioned calcining process the iodine values of the resultant products have fluctuated between 20 and 200.

It has therefore already been proposed that magnesium hydroxide should be stirred with water before the known combined heat and air treatment. However, if an industrially utilizable product is to be obtained it is necessary to use at least the same weight of water as of magnesium hydroxide. It is also necessary to preheat the washing liquid to temperatures between 80° and 100° C and to repeat the washing treatment several times.

The same treatment is necessary if a magnesium oxide obtained by thermal splitting of magnesium chloride is used as the starting material. However, the washing treatment in several stages makes the magnesium hydroxide considerably less suitable for filtering, since the product obviously takes on a slimy character as a result of the many washes.

It has therefore been proposed that an intermediate drying process should be carried out prior to washing, and that a temperature of 100° to 110° C should be maintained during the drying process. The filtering speed of the magnesium hydroxide is increased about two to 10-fold by such treatment. The drawback of this method is that the intermediate drying necessitates an extra stage in the process which, like the repeated washing, involves a considerable technical outlay.

An attempt has therefore been made to find a simple washing process where even the known intermediate drying stage can be avoided.

A method has now been found for preparing active magnesium oxide with a large specific surface area by washing with water either magnesium hydroxide or magnesium oxide obtained by thermal splitting and then by drying and calcining it at temperatures of 300° to 500° C. For the washing treatment the magnesium hydroxide or oxide is dispersed in water at a temperature of 80° to 100° C to form a turbid liquid with a turbidity density of 5 to 20 percent, preferably 10 to 15 percent, and vigorously agitated for 5 to 60 minutes, preferably 10 to 30 minutes, the temperature of the turbid liquid being kept to 80° to 110° C, preferably 85° to 95° C, by the introduction of steam, whereupon the magnesium hydroxide or oxide is separated from the turbid liquid.

A magnesium hydroxide prepared in any way, but particularly the product isolated from the mother liquor from the electrolytic preparation of magnesium hydroxide, may be used for carrying out the method of the invention. Magnesium oxide obtained by thermal splitting of magnesium chloride may equally be used as the starting material. It is an advantage for the chlorine content of the magnesium hydroxide or oxide to be less than 0.6 percent, preferably less than 0.3 percent, in respect to dry substance.

Dispersement of the magnesium hydroxide or oxide in water can be by any of the conventional means which includes mashing or grinding the compound with water.

The temperature during the washing, dispersement, and/or agitation stages is maintained by any conventional method but preferably by the introduction of steam into the liquid.

Washing the product, during filtering from the turbid mixture, with water at a temperature of 80° to 100° C results in a product having a chlorine content of less than 0.6 percent and preferably less than 0.3 percent. The filtering speed of the magnesium hydroxide or oxide is not reduced by the steps taken according to the invention and is in fact somewhat improved.

The magnesium hydroxide obtained by applying the method of the invention is then dried and calcined in known manner.

The method of the invention has the technical advantage that the magnesium hydroxide can be washed in one step, without any previous drying and without the disadvantage of making it less suitable for filtering. The method also eliminates any additional intermediate drying and any preliminary water treatment carried out in several stages.

The procedure proposed by the invention results in a magnesium hydroxide which can be calcined to produce an active magnesium oxide with a permanently high specific surface area.

The method of the invention will be explained with the aid of the following examples.

EXAMPLE 1

Electrolytically produced magnesium hydroxide is separated from the mother liquor of the electrolysis by means of a drum cell filter, and the filter cake is washed on the filter. The filtering speed attained is 30 kg/h.m$^2$.

The filter cake is dispersed in water at a temperature of 90° C to form a turbid liquid with a turbidity density of 5 percent. Steam is introduced and the turbid liquid is stirred for 15 minutes with a high-speed agitator (1,400 rpm) at a temperature of 87° C. The turbid liquid is then clarified and the resultant thick pulp is filtered by means of a drum cell filter. The filter cake is washed with water on the filter. The filtering speed is 62 kg/h.m$^2$.

The magnesium hydroxide obtained as the final product is dried and then calcined in known manner at temperatures between 300° and 500° C. An active magnesium oxide is obtained with an iodine value of 190.

EXAMPLE 2

The magnesium hydroxide isolated from the mother liquor of electrolysis as described in Example 1 is dispersed in water at 90° C to form a turbid liquid with a turbidity density of 10 percent. Steam is introduced and the turbid liquid is agitated for 20 minutes at 80° to 90° C; the thick pulp is filtered by means of a drum cell filter. The filtering speed is 78 kg/h.m$^2$. The filter cake is then dried and calcined in known manner. The resultant product has an iodine value of 192.

EXAMPLE 3

Magnesium hydroxide isolated from the mother liquor of electrolysis as described in Example 1 is dispersed in water at 90° C, as in Example 2, to form a turbid liquid with a turbidity density of 10 percent, and is agitated for 20 minutes at a temperature of 80° to 90° C which steam is introduced; the thick pulp is filtered by means of a drum cell filter. The filter cake, without being washed out, is then dried and calcined in known manner. The resultant material has an iodine value of 136.

EXAMPLE 4 (CONTROL)

Magnesium hydroxide separated from the mother liquor of electrolysis is dried and calcined without being washed on the filter and without the subsequent agitating and hot water treatment according to the invention. The resultant material has an iodine value of 10.

EXAMPLE 5

A magnesium oxide obtained by thermal decomposition of magnesium chloride is dispersed in water with a temperature of 90° C to form a turbid liquid with a turbidity density of 5 percent. Steam is introduced and the liquid is agitated at 90° C for 10 minutes, clarified by adding a flocculating agent and filtered. The filtering speed is 380 kg/h.m$^2$. The material is then dried and calcined in known manner, after which it has an iodine value of 191.

EXAMPLE 6 (CONTROL)

A magnesium oxide obtained by thermal decomposition of magnesium chloride is, as in Example 5, dispersed in water with a temperature of 90° C to form a turbid liquid with a turbidity density of 5 percent. Then, in contrast with Example 5, it is agitated for 60 minutes without any steam being introduced, after which the turbid liquid is clarified and filtered and the filter cake is dried and calcined. The resultant material has an iodine value of 140.

What is claimed is:

1. A process for the preparation of active magnesium oxide having a large specific surface area by washing with water either magnesium oxide obtained by thermal splitting or magnesium hydroxide and by subsequent drying and calcining it at temperatures of 300° to 500° C., the improvement in the washing comprising
   a. dispersing the magnesium hydroxide or magnesium oxide in water at a temperature of about 80° to 100° C. to form a turbid liquid having a turbidity density of about 5 to 20 percent;
   b. vigorously agitating said turbid liquid for about 5 to 60 minutes while maintaining said turbid liquid at a temperature of about 80° to 110° C. by the introduction of steam into said turbid liquid and
   c. separating the magnesium hydroxide or magnesium oxide from the turbid liquid.

2. A process according to claim 1 in which the magnesium oxide or hydroxide is dispersed in water by mashing said oxide or hydroxide with water.

3. A process according to claim 2 in which the turbidity density is about 10 to 15 percent.

4. A process according to claim 3 in which the agitation is for a period of about 10 to 30 minutes.

5. A process according to claim 4 in which the temperature during agitation is maintained at about 85° to 95° C.

6. A process according to claim 1 in which the magnesium oxide or hydroxide is washed with water at a temperature of about 80° to 100°C during separation (step c).

7. A process according to claim 1, in which the active magnesium oxide has an iodine value of about 136-192.

* * * * *